Figure 1:
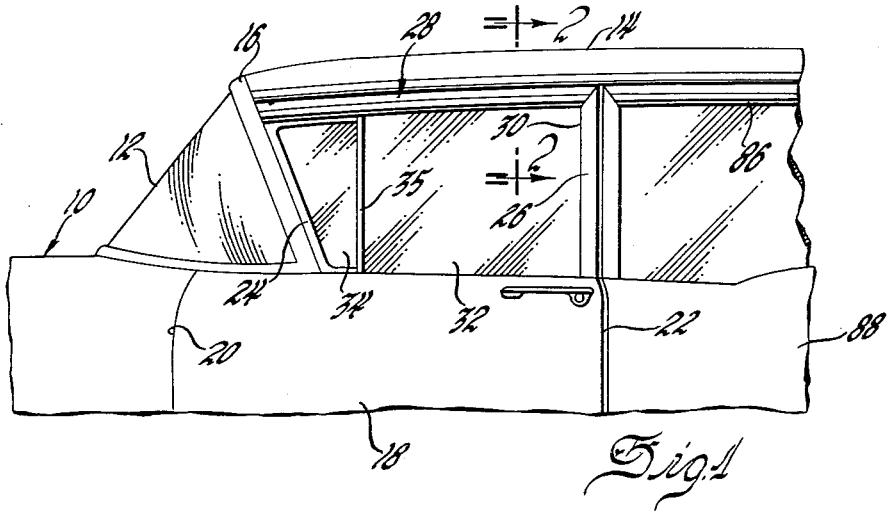

Aug. 1, 1961    R. I. McCLURE    2,994,555
VEHICLE BODY
Filed May 13, 1959

INVENTOR.
Robert I. McClure
BY
Herbert Furman
ATTORNEY

United States Patent Office 2,994,555
Patented Aug. 1, 1961

2,994,555
VEHICLE BODY
Robert I. McClure, Warren, Mich., assignor to General Motors Corporation, Detroit, Mich., a corporation of Delaware
Filed May 13, 1959, Ser. No. 812,910
6 Claims. (Cl. 296—44)

This invention relates generally to vehicle bodies and more particularly to a vehicle body glass run channel and molding assembly and mounting means therefor.

The assembly of this invention generally includes a glass run channel member and inboard and outboard molding members assembled to the edge portions of each of the legs of the glass run channel member and extending generally angularly therefrom. The mounting means generally includes a mounting channel member having a plurality of tabs lanced out of the base thereof and adapted to extend through apertures in the lower wall of the window frame member into the space between the upper and lower walls thereof so as to be secured in place by sheet metal screws which extend from the upper wall of the window frame member into engagement with the tabs. The glass run channel and molding assembly may be assembled to the mounting channel member either prior to or after the mounting channel member has been mounted on the window frame member. When the assembly is mounted on the mounting channel member, the glass run channel member is frictionally received within the mounting channel member and the moldings extend from the glass run channel member into engagement with the lower wall of the window frame member. The arrangement is such that the moldings become bowed after assembly and each of the moldings is provided with an angularly extending flange which frictionally bears against the lower wall of the window frame member to thereby conceal both the glass run channel member and the mounting channel member from view after final assembly. Since the glass run channel and molding assembly can be subassembled as a unit prior to installation on the body, there is no need to separately secure each of these parts to the window frame member as has been done in past structures. Additionally the use of the angularly extending moldings and the manner in which the moldings bear against the lower wall of the window frame member provides a neat appearing and easily mounted assembly regardless of body tolerances.

The primary object of this invention is to provide an improved glass run channel and molding assembly for vehicle bodies. Another object of this invention is to provide an improved glass run channel and molding assembly which may be pre-assembled as a unit prior to mounting on a vehicle body. A further object of this invention is to provide an improved means for mounting glass run channels on vehicle bodies. Yet another object of this invention is to provide an improved glass run channel and molding assembly which may be pre-assembled as a unit and an improved means for mounting the unit on a vehicle body window frame member.

Figure 2:
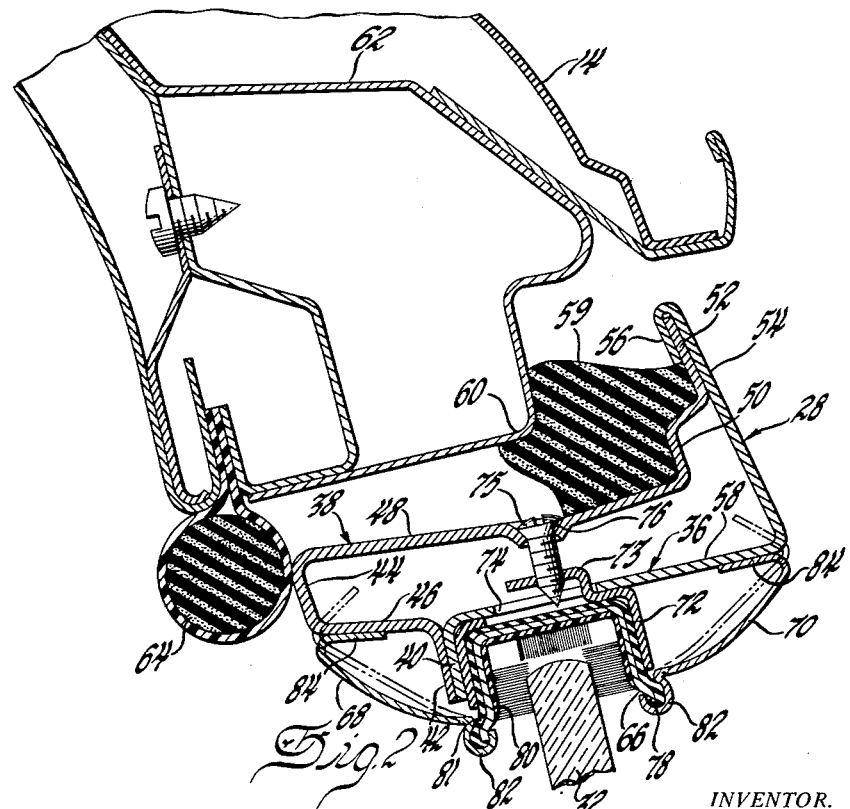

These and other objects of this invention will be readily apparent from the following specification and drawing wherein:

FIGURE 1 is a partial elevational view of a vehicle body embodying a glass run channel and molding assembly according to this invention; and FIGURE 2 is an enlarged sectional view taken generally along the plane indicated by line 2—2 of FIGURE 1.

Referring now to FIGURE 1 of the drawing a vehicle body 10 includes a windshield 12, a roof structure 14 joined to a windshield frame structure 16 which receives the upper edge portion of windshield 12, and a front door 18 swingably mounted on the body 1 adjacent its forward edge 20 and latched thereto at its rearward edge 22. The door window frame of door 18 includes a forward frame member 24, a rear frame member 26, and an upper frame member 28 joined to frame members 24 and 26 to provide the door window opening 30. The rear portion of the window opening 30 is opened and closed by a vertically movable door window 32 and the forward portion of the window opening is opened and closed by a swingable ventilation window 34, with a division post 35 provided between the windows.

Referring now particularly to FIGURE 2 of the drawings the upper frame member 28 comprises frame members 36 and 38 which provide a rigid box type construction as will be apparent from a further description. Member 36 includes a laterally extending flange 40 at one end thereof which extends generally parallel to the plane of the window opening 30 and is welded to a laterally extending flange 42 of member 38. Member 38 further includes angularly related flange portions 44 and 46, the former providing the inboard wall and the latter providing a portion of the inner or lower wall of frame member 28, and a flange portion 48 providing the outer or upper wall of frame member 28. Portion 48 merges into an angularly bent flange portion 50 which terminates in a flange 52 secured to a flange 54 of member 36 by bending an edge portion 56 of flange 54 over the flange 52. Flange 54 provides the outboard wall of frame member 28 and is joined to flanged portion 58 which in turn is joined to flange 40. Portions 46 and 58 provide the lower or inner wall of frame member 28. A weather strip 59 suitably secured to flanged portion 50 bears against a shoulder 60 of the roof rail 62 of the body to provide the outboard upper seal for the door. A windlace 64 bears against the juncture of flanged portions 44 and 48 to provide the inboard upper seal for the door.

The glass run channel and molding assembly generally includes a glass run channel 66, and inboard and outboard moldings 68 and 70 respectively. The mounting means for the assembly includes a mounting channel 72 provided with a plurality of lanced out bent tabs 73 which project through openings 74 in flanged portion 58 into the space between the upper and lower walls of frame member 28 and receive sheet metal screws 75 which extend from counter sunk openings 76 in flanged portion 48. Although only one tab 73 and opening 74 are shown in the drawing it will be understood, of course, that a plurality of spaced pairs of complementary tabs and openings are provided along the longitudinal extent of channel 72 and frame member 28. When channel 72 is mounted on the body it can be seen that the inboard leg of the channel abuts flange 40 to provide a lateral locating stop for the channel. The tabs 73 are generally of the same width as the openings 74 to provide longitudinal locating stops which cooperate with the lateral stop in accurately locating the channel on frame member 28 prior to securement of the channel thereto by means of the screws 75.

The channel 72 frictionally receives the glass run channel 66 which is of conventional construction and includes a metal channel core 78 provided with inner and outer coverings 80 and 81, respectively of rubber or plastic or other weatherstripping material bonded thereto. The outer covering 81 frictionally engages the inner surface of channel 72 when the glass run channel is inserted therein, and the inner covering 80 includes a plurality of longitudinally extending ribs or strips of felt or other material at the sides and bottom thereof which bear against the upper edge portion of the vertically movable window 32 when this window is in closed position.

Both the inboard and the outboard moldings 68 and 70 are of like construction and each includes a beaded inner edge 82 crimped over the edge portion of each of the legs of the glass run channel 66 and a terminal outer angular flange 84. The moldings are secured to the glass run channel prior to assembly of the glass channel to the mounting channel 72, and the moldings are swingable relative to the glass run channel by reason of the securing means therebetween. Since the inner edges 82 of the moldings are crimped over the inner and outer coverings 80 and 81 of the glass run channel, it can be seen that the elastomeric properties of the coverings 80 and 81 allow the moldings 68 and 70 to be rotated relative to the glass run channel.

The free position of each of the moldings 68 and 70 is shown by the dot-dash lines in the drawings and it will be noted that the moldings are flat and that the flanges 84 are approximately normal to the body of the moldings in their free position. When the glass run channel and molding assembly is mounted on frame member 28, the flanges 84 frictionally bear against the lower wall of frame member 28 adjacent the inboard and outboard edge portions thereof and the bodies of the moldings become bowed. This results from the flanges 84 being bent toward the bodies of the moldings to accommodate the angular relationship between the bodies of the moldings and the lower wall of frame member 28 and the fact that the width of the bodies of the moldings in their free position is slightly greater than the distance between the edge portions of the legs of the glass run channel and the inboard and outboard edge portions of the lower wall of the frame member 28.

After the glass run channel 66 has been assembled to the moldings 68 and 70, it is inserted within the mounting channel 72 and thereafter the entire assembly is mounted on the body by means of the tabs 73 and sheet metal screws 75. However, if desired, the mounting channel 72 can first be mounted on the body and thereafter the glass run channel and molding assembly can be assembled thereto.

If desired, either tangs or some other type of friction means may be provided between the flanges 84 of the moldings and the lower wall of the window frame member although ordinarily this may not be necessary since the fact that the molding members are bowed causes the flanges 84 to tightly bear against the lower wall so as to be retained in place.

It will be understood, of course, that the glass run channel member 66 extends only from the rear window frame member 26 to the division post 35. However, the mounting channel 72 may extend along the entire length of the upper door window frame member 28 and a different type of weatherstrip be mounted therein between the division post 35 and the forward frame window member 24 in order to provide a seal for the ventilation window 34. Accordingly, the inboard and outboard moldings 68 and 70, respectively, may be mounted on the window frame member in the manner described herein only for their extent between the frame member 26 and the division post 35 and some other means may be provided to mount the moldings on the window frame member between the division post and frame member 24.

Since the upper door window frame member 86 of the rear door 88 is of a like construction as frame member 28, the glass run channel and molding assembly and the mounting means therefor of this invention may be used with equal success on this window frame member.

Thus this invention provides an improved vehicle body glass run channel and molding assembly and mounting means therefor whereby the assembly can be pre-assembled prior to installation and thereafter easily and quickly installed on a vehicle body window frame member.

I claim:

1. In combination with a vehicle body, a window frame member having a wall defining an edge portion of a window opening and extending generally laterally to the plane of said opening, a glass run channel member, means mounting said channel member on said wall with the legs of said channel member extending generally laterally with respect to said wall, and a resilient molding member having an edge portion thereof rotatively secured to one of the legs of said channel member adjacent the free edge thereof and extending generally angularly therefrom into engagement with said wall to one side of said one of said legs, said resilient molding having a normal extent greater than the distance between said one of said legs of said channel member and said wall so as to be bowed therebetween when said molding member engages said wall.

2. In combination with a vehicle body, a window frame member having a wall defining an edge portion of a window opening and extending generally laterally to the plane of said opening, a glass run channel member, means mounting said channel member on said wall intermediate the edges thereof with the legs of said channel member extending generally laterally with respect to said wall, and a pair of resilient molding members, each having an edge portion thereof rotatively secured to one of the legs of said channel member adjacent the free edge thereof and extending generally angularly therefrom into engagement with said wall to each side of said legs, said molding members each having a normal extent greater than the distance between the legs of said channel member and said wall so as to be bowed therebetween upon engagement of said molding members with said wall.

3. In combination with a vehicle body, a window frame member having a wall defining an edge portion of a window opening and extending generally laterally to the plane of said opening, a glass run channel member, means mounting said channel member on said wall with the legs of said channel member extending generally laterally with respect to said wall, and a resilient molding member extending generally angularly from one of the legs of said channel member toward said wall to one side of said one of said legs, said molding member having one edge portion thereof rotatively secured to said one of said legs adjacent the free edge thereof and including a return bent flange at the other edge portion thereof engageable with said wall to one side of said glass run channel to thereby conceal said wall and said one of said legs of said channel member, the body of said molding member having a normal extent greater than the distance between said one of said legs of said channel member and said wall so as to be bowed therebetween upon engagement of said return bent flange with said wall.

4. In combination with a vehicle body, a window frame member having a wall defining an edge portion of a window opening and extending generally laterally to the plane of said opening, a glass run channel member, means mounting said channel member on said wall intermediate the edge portion thereof with the legs of said channel member extending generally laterally with respect to said wall, and a pair of resilient molding members, each extending generally angularly from one of the legs of said channel member toward edge portions of said wall, each molding member having one edge portion thereof rotatively secured to one of the legs of said channel member adjacent the free edge thereof and including a return bent flange at the other edge portion thereof slidably engageable with said wall adjacent an edge portion thereof to thereby conceal said glass run channel member and said wall, the bodies of said molding members each having a normal extent greater than the distance between the legs of said channel member and said wall so as to be bowed therebetween upon engagement of said return bent flanges with said wall.

5. In combination with a vehicle body, a window frame member having a wall defining an edge portion of a window opening and extending generally laterally to the plane of said opening, a glass run channel member, means mounting said channel member on said wall intermediate the edges thereof with the legs of said channel member extending generally laterally with respect to said wall, and a pair of molding members, each having a beaded inner edge portion crimped to one of the legs of said channel member so as to be rotatively secured thereto and extending generally angularly therefrom toward the edge portions of said wall, the outer edge portions of each of said molding members including a return bent flange positioned between said molding members and said wall in frictional sliding engagement with said wall adjacent the edge portions thereof.

6. In combination with a vehicle body, a window frame member including spaced inner and outer walls, said inner wall defining an edge portion of a window opening and including a plurality of apertures therein, a mounting channel having a plurality of tabs at the base portion thereof, said channel being positioned in abutting relationship to said inner wall with said tabs projecting through said apertures into the space between said inner and outer walls, means for securing said tabs to said window frame member to mount said channel thereon, a glass run channel member secured to said mounting channel, and a resilient molding member having one edge portion rotatively secured to one of the legs of said glass run channel member adjacent the free edge thereof and extending angularly therefrom into engagement with said inner wall in spaced relationship to said one of said legs to thereby conceal said one of said legs and said mounting channel, said molding member having a normal extent greater than the distance between said leg of said glass run channel member and said inner wall so as to be bowed therebetween upon engagement of said molding member with said inner wall.

References Cited in the file of this patent

UNITED STATES PATENTS

| | | |
|---|---|---|
| 1,921,601 | Bailey | Aug. 8, 1933 |
| 1,980,023 | Widman | Nov. 6, 1934 |
| 2,542,906 | Cromwell | Feb. 20, 1951 |
| 2,677,572 | Pickard | May 4, 1954 |
| 2,809,729 | Capitani | Oct. 15, 1957 |